(12) United States Patent
Masaoka et al.

(10) Patent No.: US 9,567,263 B2
(45) Date of Patent: Feb. 14, 2017

(54) DIELECTRIC COMPOSITION AND ELECTRONIC COMPONENT

(71) Applicant: TDK CORPORATION, Tokyo (JP)

(72) Inventors: Raitarou Masaoka, Tokyo (JP); Hiroki Uchiyama, Tokyo (JP); Shohei Fujii, Tokyo (JP); Noriko Ogasawara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/882,067

(22) Filed: Oct. 13, 2015

(65) Prior Publication Data

US 2016/0115084 A1    Apr. 28, 2016

(30) Foreign Application Priority Data

Oct. 27, 2014   (JP) .................................. 2014-218132
Jul. 10, 2015   (JP) .................................. 2015-138307

(51) Int. Cl.

| | | |
|---|---|---|
| *C04B 35/495* | (2006.01) | |
| *H01B 3/12* | (2006.01) | |
| *C04B 35/01* | (2006.01) | |
| *C04B 35/453* | (2006.01) | |
| *H01B 3/10* | (2006.01) | |
| *C04B 35/626* | (2006.01) | |

(52) U.S. Cl.
CPC ............. *C04B 35/495* (2013.01); *C04B 35/01* (2013.01); *C04B 35/453* (2013.01); *C04B 35/62685* (2013.01); *H01B 3/10* (2013.01); *H01B 3/12* (2013.01); *C04B 2235/3206* (2013.01); *C04B 2235/3208* (2013.01); *C04B 2235/3213* (2013.01); *C04B 2235/3215* (2013.01); *C04B 2235/3251* (2013.01); *C04B 2235/3279* (2013.01); *C04B 2235/3284* (2013.01)

(58) Field of Classification Search
CPC .................................................... C04B 35/495
See application file for complete search history.

(56) References Cited

U.S. PATENT DOCUMENTS

| | | | | |
|---|---|---|---|---|
| 4,731,207 A | * | 3/1988 | Matsumoto | ............... H01P 7/10 |
| | | | | 264/434 |
| 6,117,806 A | * | 9/2000 | Yokoi | ................... C04B 35/495 |
| | | | | 501/135 |
| 9,324,498 B2 | * | 4/2016 | Park | ..................... H01G 4/1227 |

FOREIGN PATENT DOCUMENTS

| | | | |
|---|---|---|---|
| JP | H05-148005 A | | 6/1993 |
| JP | 06076631 | * | 3/1994 |
| JP | 06076632 | * | 3/1994 |
| JP | H06-338221 A | | 12/1994 |
| JP | H08-319162 A | | 12/1996 |
| JP | 09169567 | * | 1/1997 |
| JP | 09183656 | * | 7/1997 |

OTHER PUBLICATIONS

Feb. 26, 2016 Extended Search Report issued in European Patent Application No. 15191729.1.
Chu, Ying-Hao et al., "Properties of Ba(Mg1/3Ta2/3)O3 Thin Films Prepared by Pulsed-Laser Deposition", Jpn. J. Appl. Phys., Dec. 2003, vol. 42, Part 1, No. 12, pp. 7428-7431.

* cited by examiner

*Primary Examiner* — Karl Group
(74) *Attorney, Agent, or Firm* — Oliff PLC

(57) ABSTRACT

A dielectric composition contains a complex oxide represented by the formula of $xAO\text{-}yB'O\text{-}zB''_2O_5$ as the main component, wherein A represents at least one element selected from the group made of Ba, Ca and Sr, B' represents at least one element selected from the group made of Mg, Zn and Ni, B" represents at least one element selected from the group made of Nb and Ta, and x, y and z meet the following conditions, $x+y+z=1.000$, $0.375 \le x \le 0.563$, $0.250 \le y \le 0.500$, and $x/3 \le z \le x/3+1/9$. An electronic component using the dielectric composition is also provided.

4 Claims, 3 Drawing Sheets

DIELECTRIC COMPOSITION AND ELECTRONIC COMPONENT

The present invention relates to a dielectric composition and an electronic component.

BACKGROUND

The MIMO (Multi-Input Multi-Output) technique which simultaneously utilizes a plurality of frequency bands has been put into use so as to provide a communication with a higher speed and a larger capacity in mobile communicating equipment which is represented by a smart phone or a tablet. Each frequency band requires a high-frequency component. If the frequency bands for communication are increased in number, each component needs to be further downsized and provided with more functions to maintain the original size of the equipment where increased components are disposed.

Such an electronic component working at a high frequency can be, for example, a diplexer, a band-pass filter or the like. All of these components consist of a dielectric material functioning as a capacitor and a magnetic material functioning as an inductor. In order to provide good high-frequency characteristics, the loss at a high-frequency region is required to be inhibited.

The requirements for the dielectric material are as follows. (1) Upon the requirements for downsizing, the area of the capacitor is to be decreased and the relative permittivity ($\in$r) is desired to be high. (2) For a good selectivity in frequencies, the dielectric loss is required to be low, i.e., the Q value is required to be high.

For example, as the representative material having a low dielectric loss in the GHz band, the amorphous film of SiNx can be mentioned. However, the relative permittivity ($\in$r) is as low as 6.5, so a large area is needed to provide the target functions. In this respect, it is hard to meet the downsizing requirements.

In Patent Document 1, a technique involving $Ba(Mg_{1/3}Ta_{2/3})O_3$ which is a kind of material with a low dielectric loss (i.e., a high Q value) has been disclosed. This kind of material is a condensed sintered body obtained by a thermal treatment at 1500° C. or a higher temperature, and the relative permittivity ($\in$r) at 10 GHz is 24.7 and the Q value is 51000.

In addition, it has been disclosed in Non-Patent Document 1 that $Ba(Mg_{1/3}Ta_{2/3})O_3$ is subjected to forming film through the PLD method (Pulsed Laser Deposition) and then crystallized via a thermal treatment at 600° C. so as to provide a relative permittivity ($\in$r) of 33.3 at 2.66 GHz and a tan δ of 0.0158 (the value is 63.3 when calculated in terms of Q value).

Non-Patent Document

Non-Patent Document 1: Jpn. J. Appl. Phys. Vol. 42(2003) pp. 7428-7431 "Properties of $Ba(Mg_{1/3}Ta_{2/3})O_3$ Thin Films Prepared by Pulsed-Laser Deposition"

Patent Document

Patent Document 1: JP-A-H8-319162

SUMMARY

However, with respect to the technique in Patent Document 1, it will be much too large in size if the material is to be used in the electronic component working at a high frequency. On the other hand, if $Ba(Mg_{1/3}Ta_{2/3})O_3$ in Patent Document 1 is prepared as a film to downsize the component, then no such high Q value will be obtained as that in the sintered body obtained up to now. Further, as for the technique in Non-Patent Document 1, although a relative permittivity ($\in$r) of 33.3 and a Q value of 63.3 can be obtained when $Ba(Mg_{1/3}Ta_{2/3})O_3$ is formed as a film, a higher Q value is expected for the electronic component working at a high frequency.

The present invention has been completed in view of the actual conditions mentioned above. The present invention aims to provide a dielectric composition with a high relative permittivity and a low dielectric loss (i.e., a high Q value) even when used in a downsized component and also an electronic component using the dielectric composition.

In order to achieve the mentioned goals, the dielectric composition of the present invention is characterized in that it comprises a complex oxide represented by the formula of $xAO-yB'O-zB''_2O_5$ (A represents at least one element selected from the group consisting of Ba, Ca and Sr, B' represents at least one element selected from the group consisting of Mg, Zn and Ni, and B'' represents at least one element selected from the group consisting of Nb and Ta) as the main component, wherein x, y and z meet the following conditions, $x+y+z=1.000$, $0.375 \leq x \leq 0.563$, $0.250 \leq y \leq 0.500$ and $x/3 \leq z \leq x/3+1/9$.

When x, y and z fall within the mentioned ranges, a high relative permittivity and a high Q value will be provided.

As a preferable embodiment of the present invention, the dielectric composition preferably comprises a complex oxide with x, y and z in the formula mentioned above meeting the following conditions as the main component. In particular, the conditions are $x+y+z=1.000$, $0.450 \leq x \leq 0.575$, $0.213 \leq y \leq 0.377$ and $x/3+0.025 \leq z \leq x/3+0.081$.

With ranges mentioned above for x, y and z, it is easier to maintain the long range order of B' site with B'' site which provides a high Q value, thus it is easier to provide a higher Q value.

Further, compared to the use of a dielectric composition in a conventional electronic component working at a high frequency, the use of the dielectric film of the present invention provides an electronic component such as a dielectric resonator or a dielectric filter with a sufficiently high relative permittivity and a high Q value (i.e., a high S/N ratio) even when the component is downsized.

The present invention is capable of providing a dielectric composition having a high relative permittivity and a low dielectric loss (i.e., a high Q value) even when it was downsized. Also, an electronic component using the dielectric composition can be provided in the present invention.

DETAILED DESCRIPTION OF EMBODIMENTS

Hereinafter, the preferable embodiments of the present invention will be described with reference to the drawings.

(Film Capacitor 10)

Figure 1:
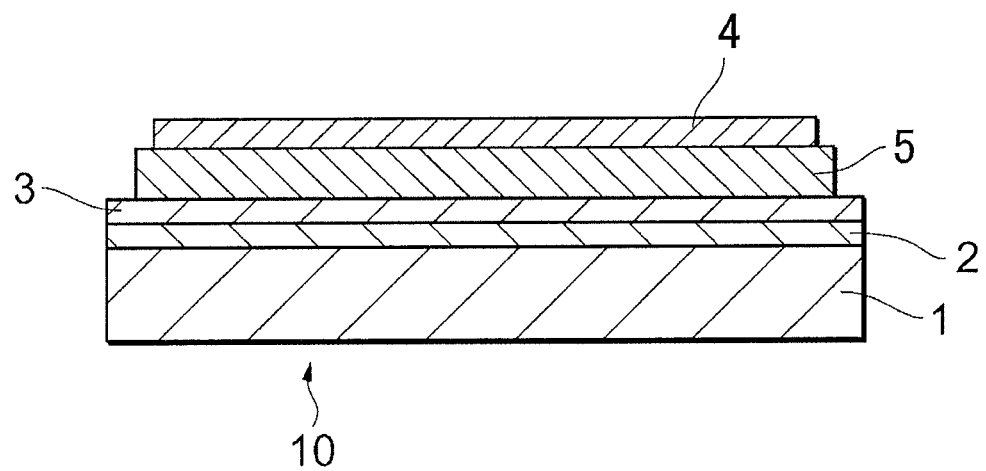
FIG. 1 is a cross-sectional view of a film capacitor in one embodiment of the present invention.

FIG. 1 is a cross-sectional view of a film capacitor 10 as an example of the electronic component using the dielectric composition in one embodiment of the present invention. The film capacitor 10 is provided with a lower electrode 3, an upper electrode 4 and a dielectric film 5 disposed between the lower electrode 3 and the upper electrode 4, which three are laminated on the surface of the supporting substrate 1. A foundation layer 2 is provided between the supporting substrate 1 and the lower electrode 3 to enhance the adhesion between them. Further, the supporting substrate 1 guarantees the whole mechanical strength in the film capacitor 10.

The shape of the film capacitor is not particularly restricted and is usually rectangular. Also, its size is not particularly restricted. The thickness or the length can be appropriately set in accordance with specific uses.

(Supporting Substrate 1)

There is no particular restriction on the material for forming the supporting substrate 1 as shown in FIG. 1. For instance, single crystal such as single crystal Si, single crystal SiGe, single crystal GaAs, single crystal InP, single crystal $SrTiO_3$, single crystal MgO, single crystal $LaAlO_3$, single crystal $ZrO_2$, single crystal $MgAl_2O_4$ and single crystal $NdGaO_3$, or ceramic polycrystalline substrate such as polycrystal $Al_2O_3$, polycrystal ZnO and polycrystal $SiO_2$, or substrate of metal such as Ni, Cu, Ti, W, Mo, Al, Pt or the like or the alloy thereof can form the supporting substrate 1, but there is no particular restriction. Among these materials, the single crystal Si is usually used as the substrate from the viewpoint of the low cost and good processabilities. The resistivity of the supporting substrate 1 varies depending on the material of the substrate. When a kind of material having a low resistivity is used as the substrate, the leakage of the current flowing towards the substrate side will affect the electric properties of the film capacitor 10 if such a substrate is directly used. Thus, sometimes an insulating treatment can be provided to the surface of the supporting substrate 1 so as to prevent the current in use from flowing to the supporting substrate 1. For example, when single crystal Si is used as the supporting substrate 1, the surface of the supporting substrate 1 can be oxidized to form an insulating layer of $SiO_2$. Alternatively, insulating materials such as $Al_2O_3$, $SiO_2$, $Si_3N_x$ or the like can be formed on the surface of the supporting substrate 1. The material for the insulating layer or the thickness of the film is not restricted as long as the supporting substrate 1 can be kept insulated. However, the film thickness is preferred to be 0.01 μm or more. A thickness less than 0.01 μm cannot guarantee the insulation and thus is not preferred as the thickness of the insulating layer. There is no particular restriction for the thickness of the supporting substrate 1 if the mechanical strength of the whole film capacitor can be ensured. For example, the thickness can be set to be 10 μm to 5000 μm. When the thickness is thinner than 10 μm, sometimes the mechanical strength cannot be ensured. On the other hand, if the thickness is thicker than 5000 μm, it cannot contribute to the downsizing of the electronic component.

(Foundation Layer 2)

In the present embodiment, the film capacitor 10 shown in FIG. 1 preferably has a foundation layer 2 on the surface of the supporting substrate 1 having been subjected to the insulating treatment. The foundation layer 2 is inserted to enhance the adhesion of the supporting substrate 1 to the lower electrode 3. For example, Cr is usually inserted as the foundation layer 2 when Cu is used in the lower electrode 3 and Ti is usually inserted as the foundation layer 2 when Pt is used as the lower electrode 3.

It is not restricted to these materials because the purpose is to improve the adhesion. In addition, the foundation layer 2 can be omitted if the adhesion of the supporting substrate 1 to the lower electrode 3 can be highly guaranteed.

(Lower Electrode 3)

The material for forming the lower electrode 3 is not particularly restricted as long as it is conductive. For instance, the lower electrode 3 can be formed by metals such as Pt, Ru, Rh, Pd, Ir, Au, Ag, Cu, Ni and the like or the alloy or the conductive oxide thereof. In this respect, the material can be selected in accordance with the cost or the atmosphere during the thermal treatment for the dielectric film 5. In addition to air, the thermal treatment to the dielectric film 5 can also be done under an inert gas such as $N_2$ or Ar or a mixed gas of $O_2$, inert gas(es) and a reductive gas $H_2$. The film thickness of the lower electrode 3 is not particularly restricted as long as the lower electrode 3 can function as an electrode. Further, the thickness is preferred to be 0.01 μm or more. A thickness less than 0.01 μm is not preferable because the conduction property will deteriorate in that case. In addition, when a substrate composed of Cu or Ni, Pt or the like or a conductive oxide material (which can be used as an electrode) is used as the supporting substrate 1, the foundation layer 2 and the lower electrode 3 can be omitted.

In addition, a thermal treatment can be provided following the formation of the lower electrode 3 so as to improve the adhesion of the foundation layer 2 to the lower electrode 3 and also to improve the stability of the lower electrode 3. When a thermal treatment is performed, the heating rate of the temperature is preferably 10° C./min to 2000° C./min, and more preferably 100° C./min to 1000° C./min. The holding temperature during the thermal treatment is preferably 400° C. to 800° C., and the holding time is preferred to be 0.1 hour to 4.0 hours. If any parameter goes beyond the ranges mentioned above, the adhesion will not be good and the surface of the lower electrode 3 will be uneven so that the dielectric properties of the dielectric film 5 is likely to deteriorate.

(Dielectric Film 5)

The dielectric composition for forming the dielectric film 5 comprises a complex oxide represented by the formula of $xAO\text{-}yB'O\text{-}zB''_2O_5$ (A represents at least one element selected from the group consisting of Ba, Ca and Sr, B' represents at least one element selected from the group consisting of Mg, Zn and Ni, and B'' represents at least one element selected from the group consisting of Nb and Ta) as the main component.

Further, when the main component of the dielectric composition is represented as $xAO\text{-}yB'O\text{-}zB''_2O_5$, then x, y and z will meet the following conditions. In particular, $x+y+z=1.000$, $0.375 \leq x \leq 0.563$, $0.250 \leq y \leq 0.500$ and $x/3 \leq z \leq x/3+1/9$.

The present inventors consider the followings as the main reasons for the effects of maintaining the high relative permittivity together with improving the Q value. In general, it is known that $A^{2+}(B'^{2+}_{1/3}B''^{5+}_{2/3})O_3$ easily occurring with a superlattice structure keeps a high Q value on the basis of the long range order of B' site with B'' site, but such a crystalline structure cannot be maintained if it is prepared as a film where the B' site is likely to be missing and the long range order of B' site with B'' site cannot be kept so that the Q value tends to decrease. If the ions of B' site are excessive, the B' site may be prevented from missing. Thus, the long range order of B' site with B'' site can be easily maintained and the Q value will be higher.

When x is less than 0.375, no sufficient relative permittivity will be obtained. If y exceeds 0.500, cracks are likely to occur after the film-forming, and the Q value tends to significantly decrease. If z is higher than x/3+1/9, the excessive $Ta_2O_5$ will easily lead to the oxygen vacancy and turn the composition semi-conductive. Also, the dielectric loss tends to increase, i.e., the Q value tends to decrease. When x exceeds 0.563 or y is less than 0.250 or z is less than x/3, the excessive BaO will react with $CO_2$ or $H_2O$ in the atmosphere so that the dielectric composition will change in qualities and it is likely that the shape cannot be maintained. If x, y and z meet the following conditions, a high relative permittivity and a high Q value can be both provided. In particular, the conditions are x+y+z=1.000, 0.375≤x≤0.563, 0.250≤y≤0.500 and x/3≤z≤x/3+1/9.

A represents at least one element selected from the group consisting of Ba, Ca and Sr. The same effect will be produced no matter only one from Ba, Ca and Sr or several elements are used. In addition, B' represents at least one element selected from the group consisting of Mg, Zn and Ni, and B" represents at least one element selected from the group consisting of Nb and Ta. Also, the same effect will be produced no matter only one element or several elements are used.

Further, a complex oxide with x, y and z in the formula meeting the following conditions is contained as the main component. In particular, the conditions are x+y+z=1.000, 0.425≤x≤0.525, 0.275≤y≤0.409 and x/3+0.025≤z≤x/3+0.081.

When x, y and z fall within the ranges mentioned above, it is easier to maintain the long range order of B' site with B" site having a high Q value and it is easier to provide a higher Q value.

The thickness of the dielectric film 5 is preferably 10 nm to 50 μm, and more preferably 50 nm to 1000 nm. If the thickness is less than 10 nm, the dielectric breakdown is likely to happen. When the thickness exceeds 2000 nm, the area of the electrode needs to be broadened so as to increase the electrostatic capacity in the capacitor, and it may be hard to downsize depending on the designs of the electronic component. In the measurement of the thickness of the dielectric film, the dielectric film can be milled by a processing device involving FIB (Focused ion beam), and then the obtained cross-section is observed through a SIM (Scanning ion microscope) to measure the length.

The dielectric film 5 is preferably formed by various methods for film-forming such as vacuum evaporation, sputtering, PLD (Pulsed laser deposition), MO-CVD (Metal-organic chemical vapor deposition), MOD (Metal organic decomposition) or Sol-Gel, CSD (Chemical solution deposition) or the like. Sometimes a trace of impurities or subcomponents may be contained in the starting material in use (the deposition material, various targets, organometalic material and etc.), but no particular problem will arise as long as they are not impurities which will significantly deteriorate the insulation properties.

Further, a trace of impurities or subcomponents may be contained in the dielectric composition as long as they are not matters which will significantly deteriorate the dielectric properties (i.e., the relative permittivity or the Q value). Thus, the amount of the main component as the balance is not particularly restricted. For example, the amount of the main component is 50% or more and 100% or less relative to the whole dielectric composition comprising the main component.

In addition, the dielectric film 5 usually only consists of the dielectric composition of the present invention, but it can also be a laminated structure in combination with films made of other dielectric compositions. For example, by making into a laminated structure with the conventional amorphous films or the crystalline films such as $Si_3N_x$, $SiO_x$, $Al_2O_x$, $ZnO_x$, $Ta_2O_x$ or the like, the impedance of the dielectric film 5 or the temperature dependence of relative permittivity can be adjusted.

(Upper Electrode 4)

In one example of the present embodiment, the film capacitor 10 is provided with an upper electrode 4 on the surface of the dielectric film 5, wherein the upper electrode 4 functions as another electrode in the film capacitor 10. The material for forming the upper electrode 4 is not particularly restricted as long as it is conductive. The upper electrode 4 can be formed by the same material as that for the lower electrode 3. Also, the thickness of the upper electrode 4 is not particularly restricted as long as the function as an electrode can be exerted, and the thickness is preferred to be 0.01 μm or more. A film thickness of 0.01 μm or less is not preferable for the upper electrode 4 because the conductivity will deteriorate in that case.

In the embodiment mentioned above, a film capacitor is presented as an example of the electronic component using the dielectric composition involved in one embodiment of the present invention. However, the electronic component using the dielectric composition of the present invention is not limited to the film capacitor and also can be any electronic component having a dielectric film such as a diplexer, a band-pass filter, a balun or a coupler.

Hereinafter, the present invention will be further described based on detailed Examples, but the present invention is not limited to these Examples.

Example 1

Comparative Example 1

First of all, a Ti film as the foundation layer with a thickness of 20 nm was formed by sputtering method on the surface of a square substrate of 10 mm×10 mm with a thickness of 350 μm, wherein, in the square substrate, there is a $SiO_2$ insulating film with a thickness of 6 μm on the surface of Si.

Next, a Pt film as the lower electrode with a thickness of 100 nm was formed by sputtering on the formed Ti film mentioned above.

The formed Ti/Pt film was subjected to a thermal treatment at the ordinary pressure under oxygen atmosphere with a heating rate of 400° C./min and a holding temperature of 700° C. for 30 minutes.

The PLD method was used in the formation of the dielectric film. The targets necessary in the formation of the dielectric film were prepared as follow.

First, MgO and $Ta_2O_5$ were weighed for Sample No. 1 to Sample No. 25 to get the amounts of Mg and Ta as shown in Table 1. The weighed starting powders together with water and $ZrO_2$ beads of ϕ2 mm were put into a wide-mouth poly-pot of 1 L and then subjected to wet mixing for 20 hours. Then, the slurry of the mixed powder was dried at 100° C. for 20 hours. The obtained mixed powder was put into a crucible made of $Al_2O_3$ and the first calcination was done in air at 1250° C. for 5 hours to provide the calcined powder of MgO—$Ta_2O_5$.

Thereafter, the obtained MgO—$Ta_2O_5$ calcined powder and $BaCO_3$ were weighed for Sample No. 1 to Sample No. 25 to get the z values as shown in Table 1. The weighed starting powders together with water and $ZrO_2$ beads of ϕ2 mm were put into a wide-mouth poly-pot of 1 L and then subjected to wet mixing for 20 hours. Then, the slurry of the mixed powder was dried at 100° C. for 20 hours. The obtained mixed powder was put into a crucible made of Al$_2$O$_3$ and the second calcination was done in air at 1050° C. for 5 hours to provide the calcined powder of BaO—MgO—Ta$_2$O$_5$.

The BaO—Ta$_2$O$_5$ based compound without Mg inhibited the generation of the target product of BaO—MgO—Ta$_2$O$_5$. However, with such calcination in two steps, BaO—Ta$_2$O$_5$ based compound was prevented from generating.

The resultant calcined powder was put into a mortar, and an aqueous solution of PVA (polyvinyl alcohol) with a concentration of 6 wt % was added as a binder in an amount of 10 wt % relative to the calcined powder. A pestle was used to prepare granulated powder, and then the granulated powders were added into a mold of φ20 mm to provide a thickness of about 5 mm. Then, a molded body was obtained by using a mono-axial press at room temperature under a pressure of 2.0×10$^8$ Pa.

After that, a de-binder treatment was provided to the resultant molded body under atmospheric air with a heating rate of 100° C./hour and a holding temperature of 400° C. for 4 hours. Then, a sintering process was performed under atmospheric air with a heating rate of 200° C./hour and a holding temperature of 1600° C. to 1700° C. for 12 hours.

The sintered body was ground on both surfaces using a cylindrical grinding machine until its thickness became 4 mm, so the target used in the PLD necessary in the formation of dielectric film had been prepared.

Thus prepared target for the PLD method was used in the PLD method to form a dielectric film with a thickness of 400 nm on the lower electrode. During the film-forming using the PLD method, the oxygen pressure was controlled at 1×10$^{-1}$ Pa and the substrate was heated to 200° C. In addition, in order to expose part of the lower electrode, a metal mask was used to form an area where no dielectric film was formed.

In the measurement of the thickness of the dielectric film, the dielectric film was milled by FIB and then the resultant cross-section was observed under SIM to measure the thickness.

After film-forming, the composition of the dielectric film was analyzed in all samples by using XRF (X-ray fluorescence analysis). It had been confirmed that the composition was identical to that described in Tables 1 to 4.

Thereafter, a vapor deposition apparatus was used to form an Ag film as the upper electrode on the resultant dielectric film. The upper electrode was formed to have a diameter of 100 μm and a thickness of 100 nm with the use of a metal mask, providing Sample No. 1 to Sample No. 45 with the structure shown in FIG. 1.

As for all the obtained film capacitor samples, the relative permittivity and the Q value were respectively measured through the following methods.

(Relative Permittivity (∈r) and Q Value)

The relative permittivity (∈r) and the Q value (no unit for both) of the film capacitor samples were calculated based on the results from the measurement of the electrostatic capacity and film thickness under a frequency of 2 GHz and a input signal level (measuring voltage) of 0.5 Vrms at a reference temperature of 25° C. using a RF impedance/material analyzer (4991A, produced by Agilent Technologies). The higher the relative permittivity was, the better the effect would be. A relative permittivity of 10 or more was deemed as a good result. Further, the Q value was preferred to be as high as possible and a value of 400 or more was deemed as a good result.

TABLE 1

| | Sample No. | AO | | | BO | | | C$_2$O$_5$ | | Relative permittivity (—) | Q value (—) |
|---|---|---|---|---|---|---|---|---|---|---|---|
| | | Ba | Ca | Sr | Mg | Zn | Ni | Nb | Ta | | |
| | | | x | | | y | | | z | | |
| Example 1 | 1 | 0.563 | 0.000 | 0.000 | 0.250 | 0.000 | 0.000 | 0.000 | 0.188 | 14 | 498 |
| | 2 | 0.469 | 0.000 | 0.000 | 0.375 | 0.000 | 0.000 | 0.000 | 0.156 | 12 | 487 |
| | 3 | 0.375 | 0.000 | 0.000 | 0.500 | 0.000 | 0.000 | 0.000 | 0.125 | 10 | 476 |
| | 4 | 0.375 | 0.000 | 0.000 | 0.445 | 0.000 | 0.000 | 0.000 | 0.181 | 12 | 468 |
| | 5 | 0.375 | 0.000 | 0.000 | 0.389 | 0.000 | 0.000 | 0.000 | 0.236 | 13 | 459 |
| | 6 | 0.427 | 0.000 | 0.000 | 0.319 | 0.000 | 0.000 | 0.000 | 0.253 | 14 | 441 |
| | 7 | 0.479 | 0.000 | 0.000 | 0.250 | 0.000 | 0.000 | 0.000 | 0.271 | 14 | 423 |
| | 8 | 0.521 | 0.000 | 0.000 | 0.250 | 0.000 | 0.000 | 0.000 | 0.229 | 14 | 461 |
| | 9 | 0.525 | 0.000 | 0.000 | 0.275 | 0.000 | 0.000 | 0.000 | 0.200 | 15 | 551 |
| | 10 | 0.475 | 0.000 | 0.000 | 0.342 | 0.000 | 0.000 | 0.000 | 0.183 | 16 | 579 |
| | 11 | 0.425 | 0.000 | 0.000 | 0.409 | 0.000 | 0.000 | 0.000 | 0.166 | 18 | 649 |
| | 12 | 0.425 | 0.000 | 0.000 | 0.381 | 0.000 | 0.000 | 0.000 | 0.195 | 17 | 637 |
| | 13 | 0.425 | 0.000 | 0.000 | 0.352 | 0.000 | 0.000 | 0.000 | 0.223 | 15 | 625 |
| | 14 | 0.454 | 0.000 | 0.000 | 0.314 | 0.000 | 0.000 | 0.000 | 0.233 | 16 | 577 |
| | 15 | 0.483 | 0.000 | 0.000 | 0.275 | 0.000 | 0.000 | 0.000 | 0.242 | 16 | 556 |
| | 16 | 0.504 | 0.000 | 0.000 | 0.275 | 0.000 | 0.000 | 0.000 | 0.221 | 15 | 553 |
| | 17 | 0.465 | 0.000 | 0.000 | 0.328 | 0.000 | 0.000 | 0.000 | 0.208 | 16 | 567 |
| Comparative Example 1 | 18 | 0.643 | 0.000 | 0.000 | 0.143 | 0.000 | 0.000 | 0.000 | 0.214 | Immeasurable | Immeasurable |
| | 19 | 0.604 | 0.000 | 0.000 | 0.250 | 0.000 | 0.000 | 0.000 | 0.146 | Immeasurable | Immeasurable |
| | 20 | 0.375 | 0.000 | 0.000 | 0.556 | 0.000 | 0.000 | 0.000 | 0.070 | 7 | 456 |
| | 21 | 0.332 | 0.000 | 0.000 | 0.557 | 0.000 | 0.000 | 0.000 | 0.111 | 9 | 328 |
| | 22 | 0.332 | 0.000 | 0.000 | 0.446 | 0.000 | 0.000 | 0.000 | 0.222 | 23 | 289 |
| | 23 | 0.375 | 0.000 | 0.000 | 0.334 | 0.000 | 0.000 | 0.000 | 0.292 | 25 | 108 |
| | 24 | 0.438 | 0.000 | 0.000 | 0.250 | 0.000 | 0.000 | 0.000 | 0.324 | 28 | 62 |
| | 25 | 0.560 | 0.000 | 0.000 | 0.143 | 0.000 | 0.000 | 0.000 | 0.312 | 32 | 51 |

Sample No. 1 to Sample No. 17

Figure 2:
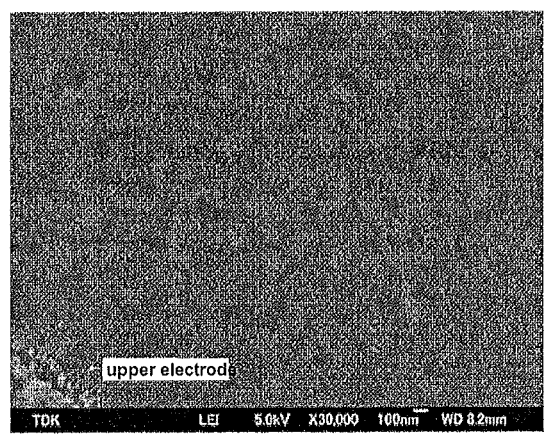
FIG. 2 is a picture taken by an SEM (scanning electron microscope) showing the surface of the dielectric film in one embodiment of the present invention where the film-forming is performed by heating the substrate to 200° C.

Similar to the sample shown in FIG. 2, no defect such as crack was found on the surface in Sample No. 1 to Sample No. 17. According to Table 1, it was determined that Sample No. 1 to Sample No. 17 were dielectric films with BaO—MgO—$Ta_2O_5$ as the main component where the main component was represented by $xBaO\text{-}yMgO\text{-}zTa_2O_5$ and x, y and z met the conditions $x+y+z=1.000$, $0.375 \leq x \leq 0.563$, $0.250 \leq y \leq 0.500$ and $x/3 \leq z \leq x/3+1/9$, and the samples had a relative permittivity of 10 or more and a Q value of 400 or more.

Sample No. 9 to Sample No. 17

According to Table 1, it was confirmed that Sample No. 9 to Sample No. 17 where the main component of the dielectric film was represented by $xBaO\text{-}yMgO\text{-}zTa_2O_5$ and x, y and z met the conditions $x+y+z=1.000$, $0.425 \leq x \leq 0.525$, $0.275 \leq y \leq 0.409$ and $x/3+0.025 \leq z \leq x/3+0.081$ had a relative permittivity of 15 or more and a Q value of 500 or more.

Sample No. 18 to Sample No. 25

Figure 3:
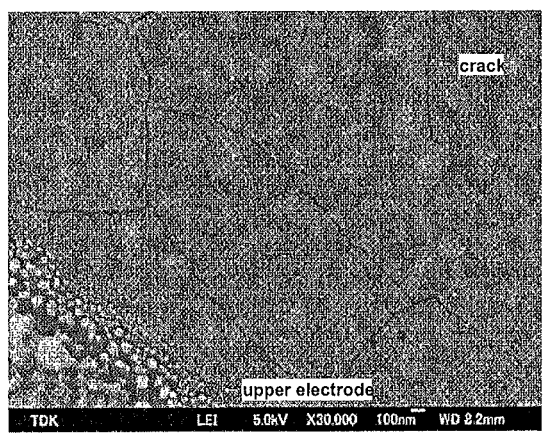
FIG. 3 is a picture taken by an SEM showing the surface of a dielectric film with the film-forming being performed by heating the substrate to 200° C. where the excessive extent of Ba is higher than that in one embodiment of the present invention.

Similar to the sample shown in FIG. 3, cracks were found on the surface in Sample No. 18 and Sample No. 19 where $x>0.563$ so that the dielectric properties cannot be evaluated. Meanwhile, similar to the sample shown in FIG. 2, no defect such as crack was found on the surface in Sample No. 20 to Sample No. 25. Sample No. 20 and Sample No. 21 where $y>0.500$ had a relative permittivity less than 10. Further, Sample No. 22 to Sample No. 25 where $z>x/3+1/9$ had a Q value less than 400.

Example 2

$BaCO_3$, $CaCO_3$, $SrCO_3$, MgO and $Ta_2O_5$ were weighed to get the amounts of Ba, Ca, Sr, Mg and Ta listed in Table 2. A calcined powder of MgO—$Ta_2O_5$ was obtained in the first calcination. Calcined powders of CaO—MgO—$Ta_2O_5$ (in Sample No. 26), SrO—MgO—$Ta_2O_5$ (in Sample No. 27), (Ba—Ca)O—MgO—$Ta_2O_5$ (in Sample No. 28), (Ca—Sr)O—MgO—$Ta_2O_5$ (in Sample No. 29), (Sr—Ba)O—MgO—$Ta_2O_5$ (in Sample No. 30) and (Ba—Ca—Sr)O—MgO—$Ta_2O_5$ (in Sample No. 31) were respectively obtained in the second calcination. Targets were prepared in the same way as in Example 1 except the composition was different, and film capacitors of Sample No. 26 to Sample No. 31 were respectively prepared. The results from the same evaluations as in Example 1 were shown in Table 2.

TABLE 2

| | | AO | | | BO | | | $C_2O_5$ | | Relative | |
|---|---|---|---|---|---|---|---|---|---|---|---|
| | Sample No. | Ba | Ca | Sr | Mg | Zn | Ni | Nb | Ta | permittivity (—) | Q value (—) |
| | | | x | | | y | | | z | | |
| Example 1 | 11 | 0.425 | 0.000 | 0.000 | 0.409 | 0.000 | 0.000 | 0.000 | 0.166 | 18 | 649 |
| Example 2 | 26 | 0.000 | 0.425 | 0.000 | 0.409 | 0.000 | 0.000 | 0.000 | 0.215 | 16 | 607 |
| | 27 | 0.000 | 0.000 | 0.425 | 0.409 | 0.000 | 0.000 | 0.000 | 0.215 | 17 | 598 |
| | 28 | 0.213 | 0.213 | 0.000 | 0.409 | 0.000 | 0.000 | 0.000 | 0.215 | 17 | 626 |
| | 29 | 0.000 | 0.213 | 0.213 | 0.409 | 0.000 | 0.000 | 0.000 | 0.215 | 16 | 602 |
| | 30 | 0.213 | 0.000 | 0.213 | 0.409 | 0.000 | 0.000 | 0.000 | 0.215 | 17 | 620 |
| | 31 | 0.142 | 0.142 | 0.142 | 0.409 | 0.000 | 0.000 | 0.000 | 0.215 | 17 | 616 |

Sample No. 11, Sample No. 26 to Sample No. 31

Similar to the sample shown in FIG. 2, no defect such as crack was found on the surface in Sample No. 26 to Sample No. 31. According to Table 2, Sample No. 11 and Sample No. 26 to Sample No. 31 exhibited substantially the same properties, wherein, the dielectric film used AO—MgO—$Ta_2O_5$ as the main component and A contained at least one selected from the group consisting of Ba, Ca and Sr. In particular, the relative permittivity was 10 or more and the Q value was 400 or more.

Example 3

$BaCO_3$, MgO, ZnO, NiO and $Ta_2O_5$ were weighed to get the amounts of Ba, Mg, Zn, Ni and Ta listed in Table 3. Calcined powders of ZnO—$Ta_2O_5$ (in Sample No. 32), NiO—$Ta_2O_5$ (in Sample No. 33), (Mg—Zn)O—$Ta_2O_5$ (in Sample No. 34), (Zn—Ni)O—$Ta_2O_5$ (in Sample No. 35), (Ni—Mg)O—$Ta_2O_5$ (in Sample No. 36), (Mg—Zn—Ni)O—$Ta_2O_5$ (in Sample No. 37) were obtained in the first calcination. And Calcined powders of BaO—ZnO—$Ta_2O_5$ (in Sample No. 32), BaO—NiO—$Ta_2O_5$ (in Sample No. 33), BaO—(Mg—Zn)O—$Ta_2O_5$ (in Sample No. 34), BaO—(Zn—Ni)O—$Ta_2O_5$ (in Sample No. 35), BaO—(Ni—Mg)O—$Ta_2O_5$ (in Sample No. 36) and BaO—(Mg—Zn—Ni)O—$Ta_2O_5$ (in Sample No. 37) were obtained in the second calcination. Targets were prepared in the same way as in Example 1 except the composition was different, and film capacitor samples were respectively prepared as Sample No. 32 to Sample No. 37. The results from the same evaluations as in Example 1 were shown in Table 3.

TABLE 3

| Sample No. | AO | | | BO | | | $C_2O_5$ | | Relative permittivity (—) | Q value (—) |
|---|---|---|---|---|---|---|---|---|---|---|
| | Ba | Ca | Sr | Mg | Zn | Ni | Nb | Ta | | |
| | x | | | y | | | z | | | |
| Example 1   11 | 0.425 | 0.000 | 0.000 | 0.409 | 0.000 | 0.000 | 0.000 | 0.166 | 18 | 649 |
| Example 3   32 | 0.425 | 0.000 | 0.000 | 0.000 | 0.409 | 0.000 | 0.000 | 0.166 | 21 | 618 |
| 33 | 0.425 | 0.000 | 0.000 | 0.000 | 0.000 | 0.409 | 0.000 | 0.166 | 17 | 603 |
| 34 | 0.425 | 0.000 | 0.000 | 0.205 | 0.204 | 0.000 | 0.000 | 0.166 | 19 | 632 |
| 35 | 0.425 | 0.000 | 0.000 | 0.000 | 0.205 | 0.204 | 0.000 | 0.166 | 19 | 610 |
| 36 | 0.425 | 0.000 | 0.000 | 0.204 | 0.000 | 0.205 | 0.000 | 0.166 | 17 | 624 |
| 37 | 0.425 | 0.000 | 0.000 | 0.136 | 0.136 | 0.136 | 0.000 | 0.166 | 19 | 622 |

Sample No. 11, Sample No. 32 to Sample No. 37

Similar to the sample shown in FIG. 2, no defect such as crack was found on the surface in Sample No. 32 to Sample No. 37. According to Table 3, Sample No. 11 and Sample No. 32 to Sample No. 37 exhibited substantially the same properties, wherein, the dielectric film used BaO—B'O—$Ta_2O_5$ as the main component and B' contained at least one selected from the group consisting of Mg, Zn and Ni. In particular, the relative permittivity was 10 or more and the Q value was 400 or more.

Example 4

$BaCO_3$, MgO, $Ta_2O_5$ and $Nb_2O_5$ were weighed to get the amounts of Ba, Mg, Ta and Nb listed in Table 4. Calcined powders of MgO—$Nb_2O_5$ (in Sample No. 38) and MgO—$(Ta—Nb)_2O_5$ (in Sample No. 39) were obtained in the first calcination. Calcined powders of BaO—MgO—$Nb_2O_5$ (in Sample No. 38) and BaO—MgO—$(Ta—Nb)_2O_5$ (in Sample No. 39) were obtained in the second calcination. Targets were prepared in the same way as in Example 1 except the composition was different, and film capacitors of Sample No. 27 and Sample No. 28 were respectively prepared. The results from the same evaluations as in Example 1 were shown in Table 4.

TABLE 4

| Sample No. | AO | | | BO | | | $C_2O_5$ | | Relative permittivity (—) | Q value (—) |
|---|---|---|---|---|---|---|---|---|---|---|
| | Ba | Ca | Sr | Mg | Zn | Ni | Nb | Ta | | |
| | x | | | y | | | z | | | |
| Example 1   11 | 0.425 | 0.000 | 0.000 | 0.409 | 0.000 | 0.000 | 0.000 | 0.166 | 18 | 649 |
| Example 4   38 | 0.425 | 0.000 | 0.000 | 0.409 | 0.000 | 0.000 | 0.166 | 0.000 | 24 | 609 |
| 39 | 0.425 | 0.000 | 0.000 | 0.409 | 0.000 | 0.000 | 0.083 | 0.083 | 21 | 627 |

Sample No. 11, Sample No. 38 and Sample No. 39

Similar to the sample shown in FIG. 2, no defect such as crack was found on the surface in Sample No. 38 and Sample No. 39. According to Table 4, Sample No. 11, Sample No. 38 and Sample No. 39 exhibited substantially the same properties, wherein, the dielectric film used BaO—MgO—$B''_2O_5$ as the main component and B" contained at least one selected from the group consisting of Nb and Ta. In particular, the relative permittivity was 10 or more and the Q value was 400 or more.

Example 5

$BaCO_3$, $CaCO_3$, $SrCO_3$, MgO, ZnO, NiO, $Ta_2O_5$ and $Nb_2O_5$ were weighed to get the amounts of Ba, Ca, Sr, Mg, Zn, Ni, Ta and Nb listed in Table 5. Calcined powders of (Mg—Zn)O—$(Ta—Nb)_2O_5$ (in Sample No. 40), (Zn—Ni)O—$(Ta—Nb)_2O_5$ (in Sample No. 41), (Ni—Mg)O—$(Ta—Nb)_2O_5$ (in Sample No. 42) and (Mg—Zn—Ni)O—$(Ta—Nb)_2O_5$ (in Sample No. 43) were respectively obtained in the first calcination. Calcined powders of (Ba—Ca)O—(Mg—Zn)O—$(Ta—Nb)_2O_5$ (in Sample No. 40), (Ca—Sr)O—(Zn—Ni)O—$(Ta—Nb)_2O_5$ (in Sample No. 41), (Sr—Ba)O—(Ni—Mg)O—$(Ta—Nb)_2O_5$ (in Sample No. 42) and (Ba—Ca—Sr)O—(Mg—Zn—Ni)O—$(Ta—Nb)_2O_5$ (in Sample No. 43) were obtained in the second calcination. Targets were prepared in the same way as in Example 1 except the composition was different, and film capacitors of Sample No. 40 to Sample No. 43 were respectively prepared. The results from the same evaluations as in Example 1 were shown in Table 5.

TABLE 5

| | Sample No. | A | | | B | | | C | | Relative permittivity (—) | Q value (—) |
|---|---|---|---|---|---|---|---|---|---|---|---|
| | | Ba | Ca | Sr | Mg | Zn | Ni | Nb | Ta | | |
| | | | x | | | y | | | z | | |
| Example 5 | 40 | 0.213 | 0.213 | 0.000 | 0.205 | 0.204 | 0.000 | 0.083 | 0.083 | 22 | 611 |
| | 41 | 0.000 | 0.213 | 0.213 | 0.000 | 0.205 | 0.204 | 0.083 | 0.083 | 21 | 600 |
| | 42 | 0.213 | 0.000 | 0.213 | 0.204 | 0.000 | 0.205 | 0.083 | 0.083 | 20 | 607 |
| | 43 | 0.142 | 0.142 | 0.142 | 0.136 | 0.136 | 0.136 | 0.083 | 0.083 | 21 | 605 |

Sample No. 40 to Sample No. 43

Similar to the sample shown in FIG. 2, no defect such as crack was found on the surface in Sample No. 40 to Sample No. 43. According to Table 5, Sample No. 40 to Sample No. 43 which were dielectric films with AO-B'O—B"$_2$O$_5$ as the main component exhibited substantially the same properties, wherein, A contained at least one element selected from the group consisting of Ba, Ca and Sr, B' contained at least one element selected from the group consisting of Mg, Zn and Ni and B" contained at least one element selected from the group consisting of Nb and Ta. In particular, the relative permittivity was 10 or more and the Q value was 400 or more.

Example 6

A sample was prepared by using the same method as that for Sample No. 11 in Example 1 except the film-forming of the dielectric film was performed by sputtering method. Also, the same evaluation was done as in Example 1. The results were shown in Table 6.

Example 7

A sample was prepared by using the same method as that for Sample No. 11 in Example 1 except the dielectric film was prepared with a thickness of 800 nm. Also, the same evaluation was done as in Example 1. The results were shown in Table 6.

TABLE 6

| | Sample No. | AO | | | BO | | | C$_2$O$_5$ | | Relative permittivity (—) | Q value (—) |
|---|---|---|---|---|---|---|---|---|---|---|---|
| | | Ba | Ca | Sr | Mg | Zn | Ni | Nb | Ta | | |
| | | | x | | | y | | | z | | |
| Example 1 | 11 | 0.425 | 0.000 | 0.000 | 0.409 | 0.000 | 0.000 | 0.000 | 0.166 | 18 | 649 |
| Example 6 | 44 | 0.425 | 0.000 | 0.000 | 0.409 | 0.000 | 0.000 | 0.000 | 0.166 | 16 | 633 |
| Example 7 | 45 | 0.425 | 0.000 | 0.000 | 0.409 | 0.000 | 0.000 | 0.000 | 0.166 | 15 | 645 |

Sample No. 44 and Sample No. 45

Similar to the sample shown in FIG. 2, no defect such as crack was found on the surface in Sample No. 44 and Sample No. 45. It can be known from Table 6 that even if the preparation method (in Sample No. 44) or the thickness of the dielectric film (in Sample No. 45) was different, the use of the dielectric film of the present embodiment would provide a relative permittivity of 10 or more and a Q value of 400 or more.

As described above, the present invention relates to a dielectric composition and an electronic component. In particular, the present invention provides a dielectric composition and an electronic component using this dielectric composition, in which the dielectric composition and the electronic component have a high relative permittivity and a low dielectric loss (i.e., a high Q value) even when they are downsized. In this respect, the electronic component using the dielectric composition can be downsized and provided with excellent functions. The present invention widely provides novel technologies to a film component working at a high frequency which uses dielectric films such as a diplexer or a band-pass filter.

DESCRIPTION OF REFERENCE NUMERALS

1 Supporting substrate
2 Foundation layer
3 Lower electrode
4 Upper electrode
5 Dielectric film
10 Film capacitor

What is claimed is:

1. A dielectric composition comprising a complex oxide represented by the formula of xAO-yB'O-zB"$_2$O$_5$ as the main component, wherein, A represents at least one element selected from the group consisting of Ba, Ca and Sr, B' represents at least one element selected from the group consisting of Mg and Ni, B" represents at least one element selected from the group consisting of Nb and Ta, and x, y and z meet the following conditions, $x+y+z=1.000$, $0.375 \leq x \leq 0.563$, $0.250 \leq y \leq 0.500$, and $x/3 \leq z \leq x/3+1/9$.

2. The dielectric composition of claim 1 wherein, x, y and z in the formula meet the following conditions, $x+y+z=1.000$, $0.425 \leq x \leq 0.525$, $0.275 \leq y \leq 0.409$, and $x/3+0.025 \leq z \leq x/3+0.081$.

3. An electronic component comprising the dielectric composition of claim 1.

4. An electronic component comprising the dielectric composition of claim 2.

* * * * *